No. 661,416. Patented Nov. 6, 1900.
C. MERRYWEATHER.
AUTOMATICALLY ADJUSTABLE HEADLIGHT.
(Application filed Dec. 1, 1899.)
(No Model.)
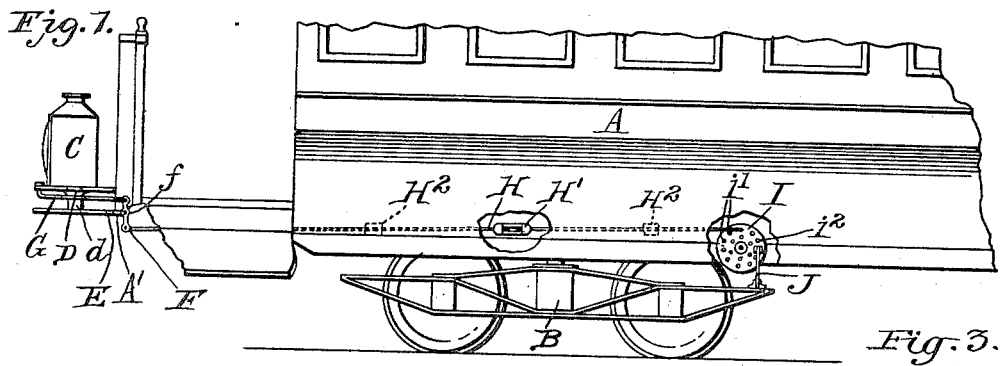
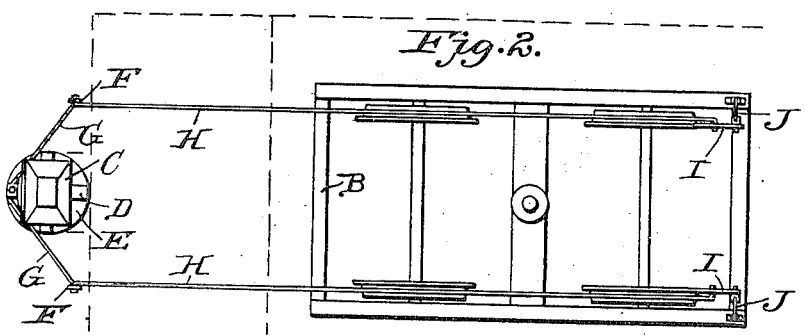
WITNESSES:
Edwin G. McKee.
G. H. Anderson
INVENTOR
Chas. Merryweather
BY
E. W. Anderson
his ATTORNEY.

UNITED STATES PATENT OFFICE.

CHARLES MERRYWEATHER, OF ANDERSON, INDIANA.

AUTOMATICALLY-ADJUSTABLE HEADLIGHT.

SPECIFICATION forming part of Letters Patent No. 661,416, dated November 6, 1900.

Application filed December 1, 1899. Serial No. 738,938. (No model.)

*To all whom it may concern:*

Be it known that I, CHARLES MERRYWEATHER, a citizen of the United States, and a resident of Anderson, in the county of Madison and State of Indiana, have invented certain new and useful Improvements in Automatically-Adjustable Headlights; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a side elevation of the invention as applied and partly broken away. Fig. 2 is a plan view of a car-truck, showing the invention as applied thereto, the car being indicated by dotted lines. Figs. 3 and 4 are detail views illustrating the revoluble bearings of the lantern.

This invention is designed to provide a headlight for street and motor cars and other vehicles having double trucks, so arranged that the light will follow the movement of the trucks and will therefore always throw its light on the track in turning curves and bends in the road.

With this object in view the invention consists in the novel construction and combination of parts, all as hereinafter described, and pointed out in the appended claim.

Referring to the accompanying drawings, the letter A designates the body of a street-car, and B the forward truck of said car, of the usual character.

C designates a headlight-lantern. Secured movably or otherwise to the front portion of the base of said lantern is a plate D, which is formed with a depending hollow central boss $d$, which fits revolubly a stud or spindle $e$ of a plate or bracket E, which is rigidly secured to a forward projection A' of the car-body.

F designates a lever which is pivoted at $f$ to the car-frame. One arm of this lever is connected by a rod or link G with the base of the lantern C, and its other arm is connected by a rod or link H with a lever I, which is pivoted to the car-frame over the rear portion of the front truck. This lever is shown as consisting of a wheel or disk having therein numerous perforations $i'$, any one of which is designed to be engaged by the rear end portion of the rod or link H and also other perforations $i^2$, any one of which may be engaged by the bent end of a rod or link J, whose other end is connected to the rear portion of the front truck-frame. The rod or link H is shown as being formed in two sections, connected by a turnbuckle H'. H² designates suitable intermediate guides or supports for the said rod H.

The above-described connections and parts exist in duplicate at each side of the truck, as shown in Fig. 2, the connections upon the two sides being made, of course, with opposite sides of the lantern-base.

It will be readily seen that the movement of the front truck in turning a curve in each direction will actuate the levers I to slack one of the rods H and pull upon the other, thereby through the connections described turning the lantern-body through a proportionable arc, so that its light will always be thrown onto the track directly ahead.

Both ends of the car will usually be provided with a similar rotary support for the lantern, and both ends of the car will be similarly equipped to provide for the described operation with the car going in either direction.

By adjusting the points of connection of the rods H and J with the lever I the extent of movement of the lantern can be properly regulated in applying the device to a car.

It will be noted that as the link G connects the rod H with the front portion of the headlight-support a given movement of said rod H will effect a greater degree of rotation of said support than were said link G connected with the sides of said support, whereby the operation of the device is made more delicate.

Having thus described my invention, what I claim as new, and desire to secure by Letters Patent, is—

The combination with a vehicle and its pivoted truck, of a headlight rotatably supported upon said vehicle, an intermediately-pivoted, vertical lever adjacent to one end of said truck, an intermediately-pivoted vertical lever adjacent to said headlight, a connection between the lower arm of said first-named lever and the truck, a connection between the upper arm of said first-named lever and the lower arm of said last-named lever, and a connection between the upper arm of said last-named lever and said headlight, substantially as specified.

In testimony whereof I affix my signature in presence of two witnesses.

CHARLES MERRYWEATHER.

Witnesses:
ANNA K. CHIPMAN,
MARY H. CHIPMAN.